(12) United States Patent
Ogawa et al.

(10) Patent No.: US 8,954,960 B2
(45) Date of Patent: Feb. 10, 2015

(54) THIN CLIENT SYSTEM AND METHOD OF IMPLEMENTING THIN CLIENT SYSTEM

(75) Inventors: Ryuichi Ogawa, Tokyo (JP); Takayuki Sasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 360 days.

(21) Appl. No.: 13/143,405

(22) PCT Filed: Jan. 5, 2010

(86) PCT No.: PCT/JP2010/050012
§ 371 (c)(1),
(2), (4) Date: Jul. 6, 2011

(87) PCT Pub. No.: WO2010/079772
PCT Pub. Date: Jul. 15, 2010

(65) Prior Publication Data
US 2011/0276964 A1    Nov. 10, 2011

(30) Foreign Application Priority Data

Jan. 7, 2009    (JP) ................................. 2009-001372

(51) Int. Cl.
| | | |
|---|---|---|
| G06F 9/46 | (2006.01) | |
| G06F 15/16 | (2006.01) | |
| H04L 29/08 | (2006.01) | |
| G06F 9/48 | (2006.01) | |

(52) U.S. Cl.
CPC ............. G06T 13/385 (2013.01); H04L 67/10 (2013.01); G06F 9/4856 (2013.01)
USPC ................................................ 718/1; 709/201

(58) Field of Classification Search
CPC ............................ G06F 9/4856; H04L 64/10

USPC ................................................ 718/1; 709/201
See application file for complete search history.

(56) References Cited

U.S. PATENT DOCUMENTS

| | | | | |
|---|---|---|---|---|
| 6,738,347 | B1 * | 5/2004 | Mio et al. ...................... | 370/230 |
| 7,051,054 | B1 * | 5/2006 | Lee et al. ............................... | 1/1 |
| 2008/0114955 | A1 * | 5/2008 | Kitayama et al. ............. | 711/163 |

FOREIGN PATENT DOCUMENTS

| | | | |
|---|---|---|---|
| EP | 1983432 | * | 4/2008 |
| JP | 9-319624 | A | 12/1997 |
| JP | 10-133976 | A | 5/1998 |
| JP | H10-240538 | A | 9/1998 |
| JP | 2005318074 | A | 11/2005 |
| JP | 2006-11541 | A | 1/2006 |

(Continued)

OTHER PUBLICATIONS

International Search Report for PCT/JP2010/050012 mailed Apr. 13, 2010.

(Continued)

*Primary Examiner* — Camquy Truong
(74) *Attorney, Agent, or Firm* — Sughrue Mion, PLLC

(57) ABSTRACT

In a net boot type thin client system, bottle necks concentrate on specific steps in a previously downloading method and an on-demand downloading method so as to hinder high-speed operation. Specifically, a previously file acquiring section for acquiring a file before the OS operates, an on-demand file acquiring section for acquiring a file while the OS operates, and a file determining section for determining whether or not a file is used in a high frequency. A high use-frequency file is downloaded before an OS operates and a low use-frequency file is downloaded while the OS operates.

22 Claims, 8 Drawing Sheets

(56) References Cited

FOREIGN PATENT DOCUMENTS

| JP | 2006-39888 A | 2/2006 |
|---|---|---|
| JP | 2006519423 A | 8/2006 |
| JP | 2008158711 A | 7/2008 |
| JP | 2008198016 A | 8/2008 |
| JP | 2009-48231 A | 3/2009 |

OTHER PUBLICATIONS

"Thin Client vs Next Generation PC" ITPro, Internet, <http://itpro.nikkeibp.co.jp/article/COLUMN/20070528/272681/>.

"It searches a thin client mechanism", ZDNet, Internet, pan.zdnet.com/print/ 0,2000080657,20089685,00.htm?u=/zdnet/2006/sp/feature/netsecurity1/story/0,2000056696,20089685,00.htm>, Oct. 27, 2005.

HTTP-FUSE-KNOPPIX/Xenoppix, Internet, <unit.aist.go.jp/itri/knoppix/http-fuse/>.

M. Nakamura et al., "Security Enhancement of HTTP-FUSE KNOPPIX Client by Trusted Computing", IPSJ SIG Technical Reports, 2006-CSEC-34 (31), Jul. 20, 2006, pp. 223-230.

Japanese Office Action for JP Application No. 2010-545758 mailed on Aug. 20, 2013 with a partial English Translation.

* cited by examiner

| TYPE | VALUE |
|---|---|
| PATH | C:¥a¥b.ini |
| DIRECTORY | C:¥OS |
| EXTENSION | *.exe |

Fig. 5

| FILE NAME | USE COUNT |
|---|---|
| C:¥a¥b.txt | 15 TIMES |
| C:¥d¥e.exe | 30 TIMES |
| C:¥f¥x.bat | ONE TIME |

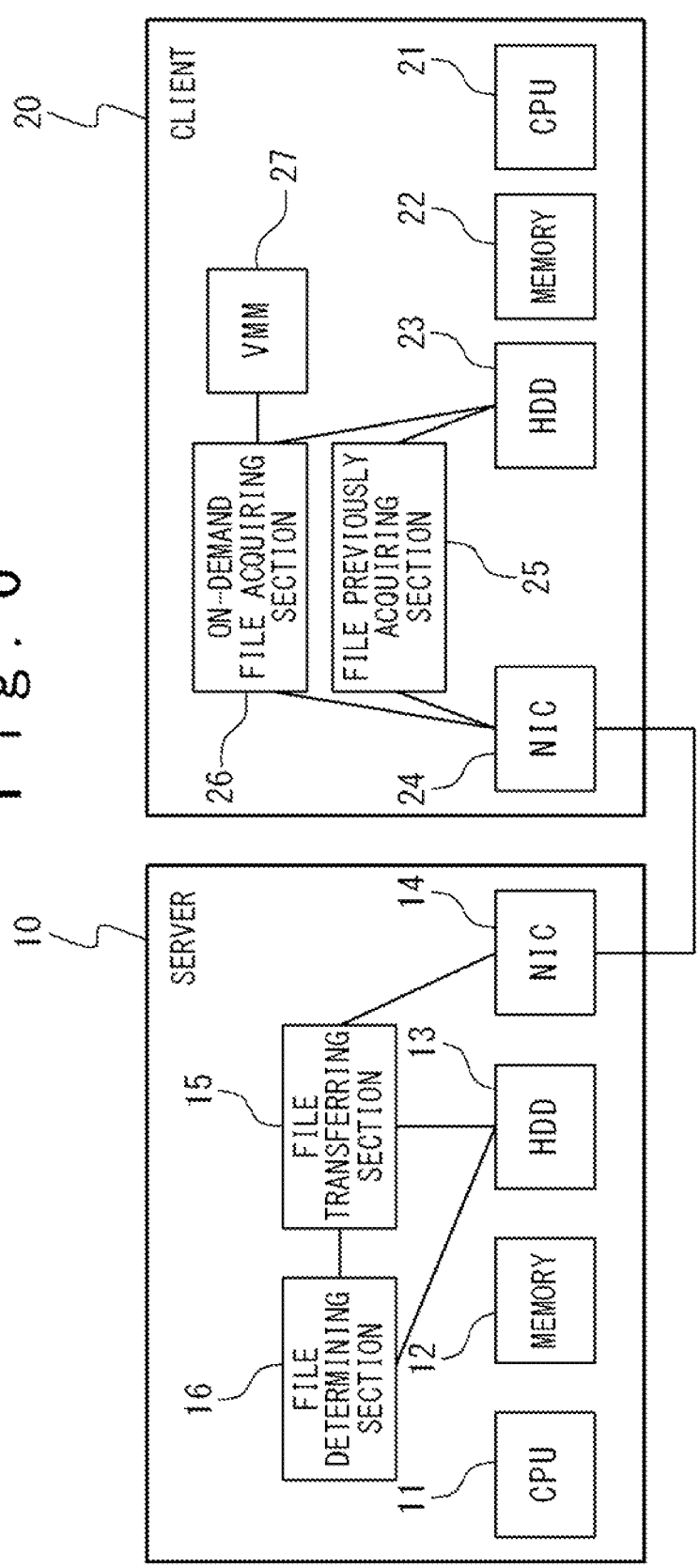

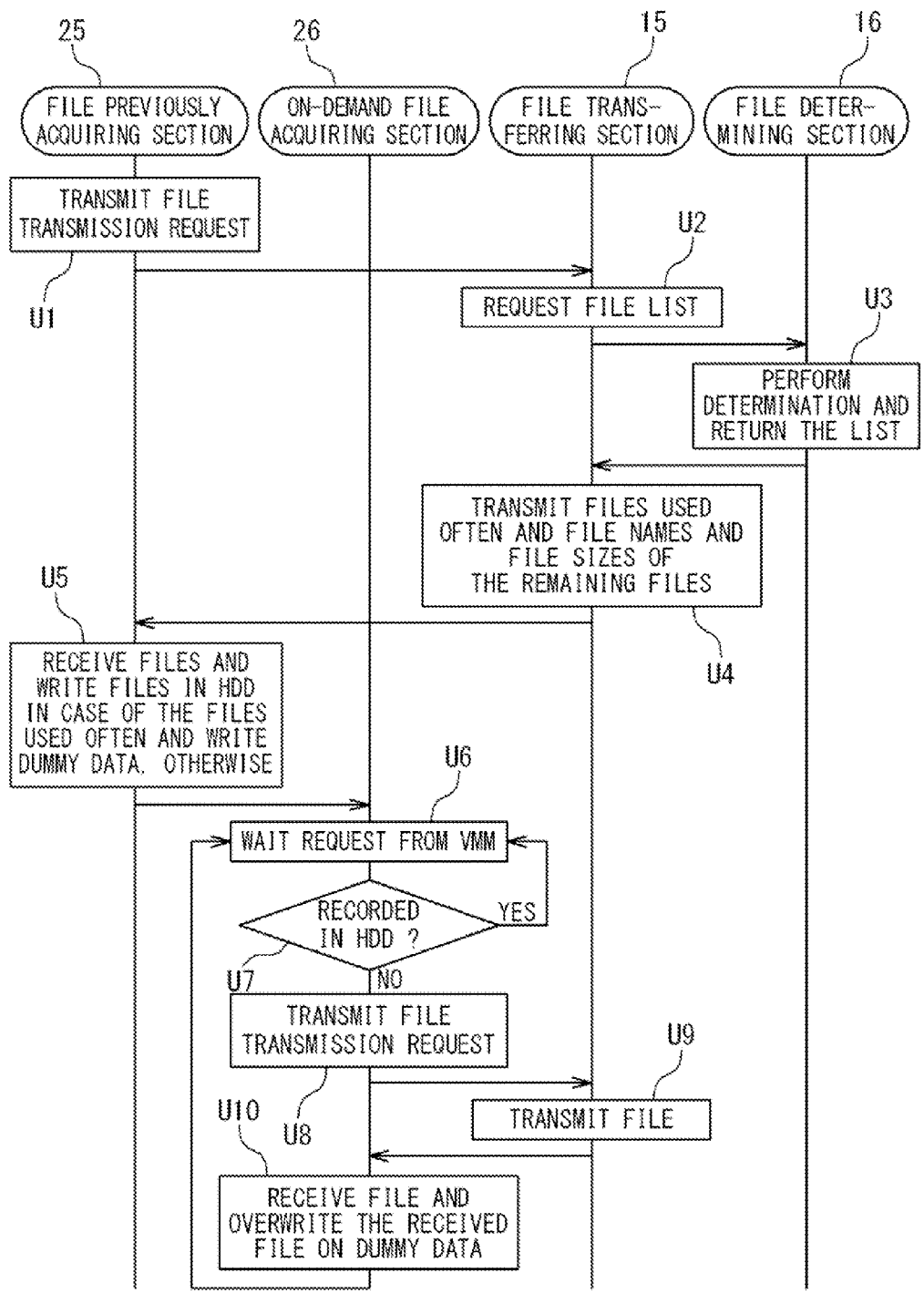

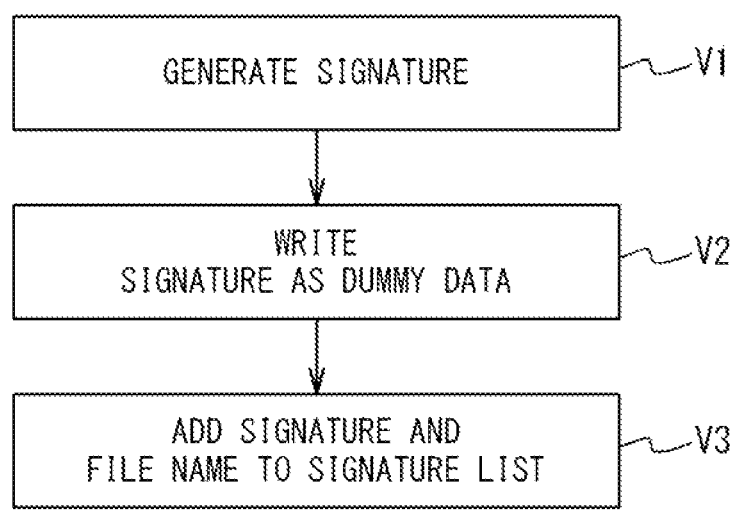

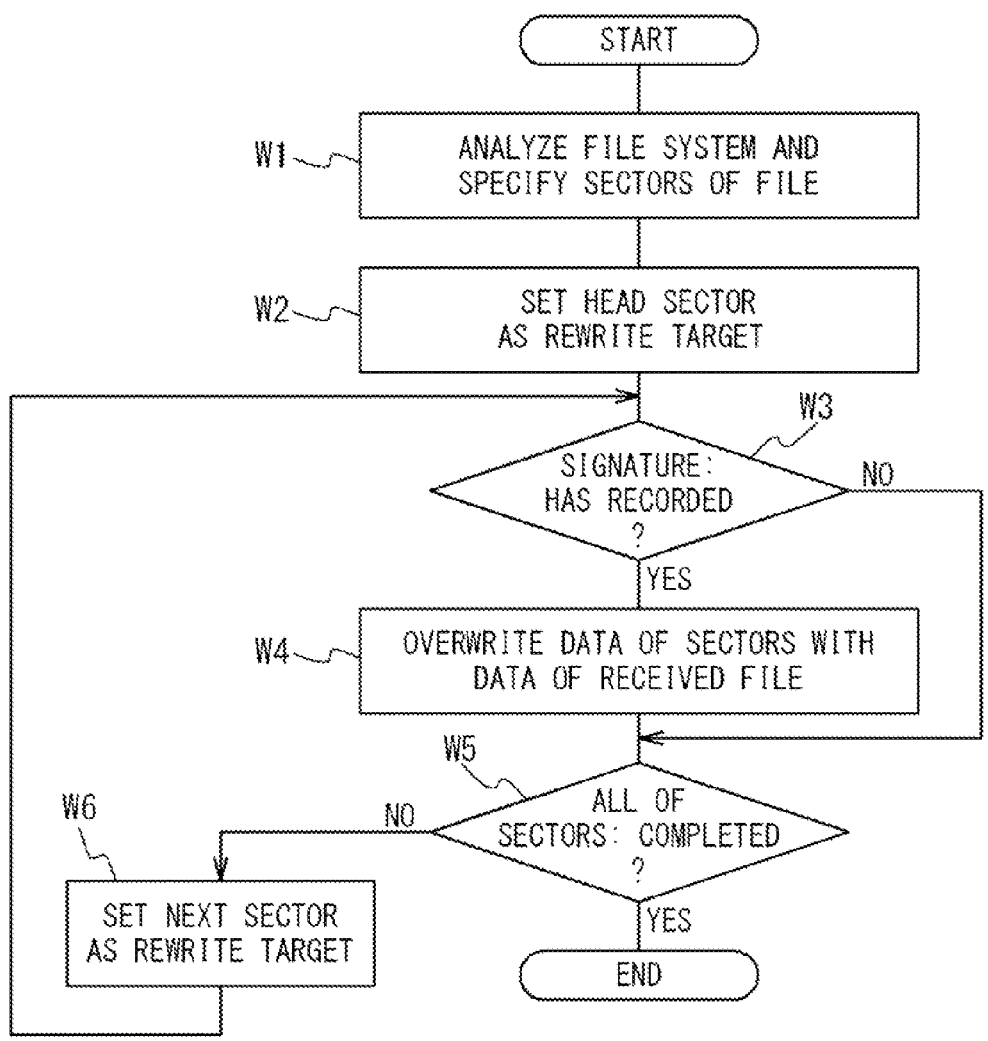

THIN CLIENT SYSTEM AND METHOD OF IMPLEMENTING THIN CLIENT SYSTEM

TECHNICAL FIELD

The present application is the National Phase of PCT/JP2010/050012, filed Jan. 5, 2010, which claims a priority on convention based on Japanese Patent Application No. 2009-001372, and the disclosure thereof is incorporated herein by reference.

BACKGROUND ARTS

A conventional thin client system is classified into a screen transfer type thin client system and a net boot type thin client system (Non-Patent Literature 1).

The screen transfer type thin client system is a system which transfers a screen of an OS (Operating System) operating on a server to a client and inputs from a keyboard and a mouse in the client to the server. In the screen transfer type thin client system, because the OS is executed on the server, the server needs to be provided a high-speed CPU (Central Processing Unit) and a memory of a large capacity.

On the other hand, the net boot-type thin client system is a system in which a client downloads and executes an application (application software) and user data from a server and uploads a changed file to the server. The net boot type thin client system is provided only with a storage, and the client reads and writes directly from and to the storage.

Moreover, the net boot type thin client system is classified into a previously downloading type and an on-demand type.

The previously downloading type system is a system which downloads all files before the OS starts, as in Non-Patent Literature 2. In the previously downloading type system, because all the files are downloaded before the OS starts, including a file which is not usually used, it takes a long time until the OS is started.

The on-demand type system is a system which downloads a file when the file is actually used as in Non-Patent Literature 3. In the on-demand type system, because the file is downloaded when being required, it takes a long time until the OS and the application become ready.

Also, in both types of systems, the decrease (bottle neck) of a response speed for file acquisition occurs intensively on a specific step, and a user feels that a PC (personal computer) becomes very late in some moment.

It should be noted that as related techniques, a thin client system, an apparatus and a program are disclosed in JP 2008-198016A (Patent Literature 1). In this related technique, the net boot type thin client system in which a rich client as a general-purpose PC is available as a thin client has been described.

Also, a file control apparatus is disclosed in JP H09-319624A (Patent Literature 2). In this related technique, a plurality of files and a final use date and time and a storage location of each of these files are stored in a first storage. The file with a low use-frequency is determined based on the final use date and time for every file. The determined file is stored in the second storage.

Also, a system and a method for an on-demand file downloading are disclosed in JP H10-133976 (Patent Literature 3). In this related technique, in order to share a content of a file or a program or data as a content of a memory in a plurality of calculation periods, the program or the data is transferred through a route and downloaded in a computer which uses the program or the data. In this on-demand file downloading method, a necessary part of a file in which the program or the data is stored is specified from a first computer and requested to a second computer which has the originals of the program or the data. The second computer extracts the necessary part of the file requested from the first computer, and copies and transfers it to the first computer in units of packets. The first computer stores the transferred contents in a predetermined area and resumes the processing of the program.

CITATION LIST

Patent Literature

[Patent Literature 1]: JP 2008-198016A
[Patent Literature 2]: JP H09-319624A
[Patent Literature 3]: JP H10-133976A Non-Patent Literature

[Non-Patent Literature 1]:
  ITPro "Thin Client vs Next Generation PC"<http://it-pro.nikkeibp.co.jp/article/COLUMN/20070528/272681/>
[Non-Patent Literature 2]
  ZDNet "It searches a thin client mechanism". <http://japan.zdnet.com/print/0,2000080657,20089685,00.htm?u=/zdnet/2006/sp/feature/netsecurity1/story/0,2000056696,20089685,00.htm>
[Non-Patent Literature 3]
  HTTP-FUSE-KNOPPIX/Xenoppix <http://unit.aist.go.jp/itri/knoppix/http-fuse/>

SUMMARY OF THE INVENTION

An object of the present invention is to provide a net boot type thin client system in which bottle neck portions are appropriately distributed.

The thin client system of the present invention is provided with a first computer used by a user and a second computer which provides unit data to the first computer. The first computer is provided with a first memory section, a unit data previously acquiring section and an on-demand unit data acquiring section. The first memory section stores the unit data acquired from the second computer. The unit data is acquired from the second computer by the unit data previously acquiring section before OS (Operating System) of the first computer operates. The unit data requested by the OS while the OS operates is acquired from the second computer by the on-demand unit data acquiring section. The second computer is provided with a second memory section, a unit data determining section and a unit data transferring section. The second memory section stores the unit data to be provided to the first computer. The unit data determining section generates a transmission file list in which the information of the unit data acquired by the unit data previously acquiring section before the OS operates is written. The unit data transferring section transmits the unit data whose information is written in the transmission file list before the OS of the first computer operates to the unit data previously acquiring section, and transmits the unit data required from the on-demand unit data acquiring section while the OS of the first computer operates to the on-demand unit data acquiring section.

In a method of implementing a thin client system of the present invention, the unit data is acquired from a second computer by a first computer which is used by the user. At this time, the unit data is acquired from the second computer by the first computer before OS (Operating System) of the first computer operates. Also, the unit data requested by the OS while the OS operates is acquired from the second computer by the first computer. Also, the second computer generates a transmission file list in which information of the unit data acquired by the first computer before the OS operates is written. Also, the second computer transmits to the first computer, the unit data whose information is written in the transmission file list before the OS of the first computer operates, and transmits the unit data required from the first computer while the OS of the first computer operates to the first computer.

The net boot type thin client system is made possible to operate at high speed.

BRIEF DESCRIPTION OF THE DRAWINGS

FIG. 5 is a diagram showing an example of statistic data;

FIG. 6 is a block diagram showing a configuration of the thin client system according to a second exemplary embodiment of the present invention;

FIG. 7 is a sequence chart showing an operation of the second exemplary embodiment of the present invention;

FIG. 8 is a flow chart of generation of a dummy file in the second exemplary embodiment of the present invention;

FIG. 9 is a diagram showing an example of a signature list in the second exemplary embodiment of the present invention; and FIG. 10 is a flow chart showing an operation of an on-demand file acquiring section in the second exemplary embodiment of the present invention.

DESCRIPTION OF EXEMPLARY EMBODIMENTS

[First Exemplary Embodiment]

Hereinafter, a first exemplary embodiment of the present invention will be described with reference to the attached drawings.
(Basic Configuration)

Figure 1:
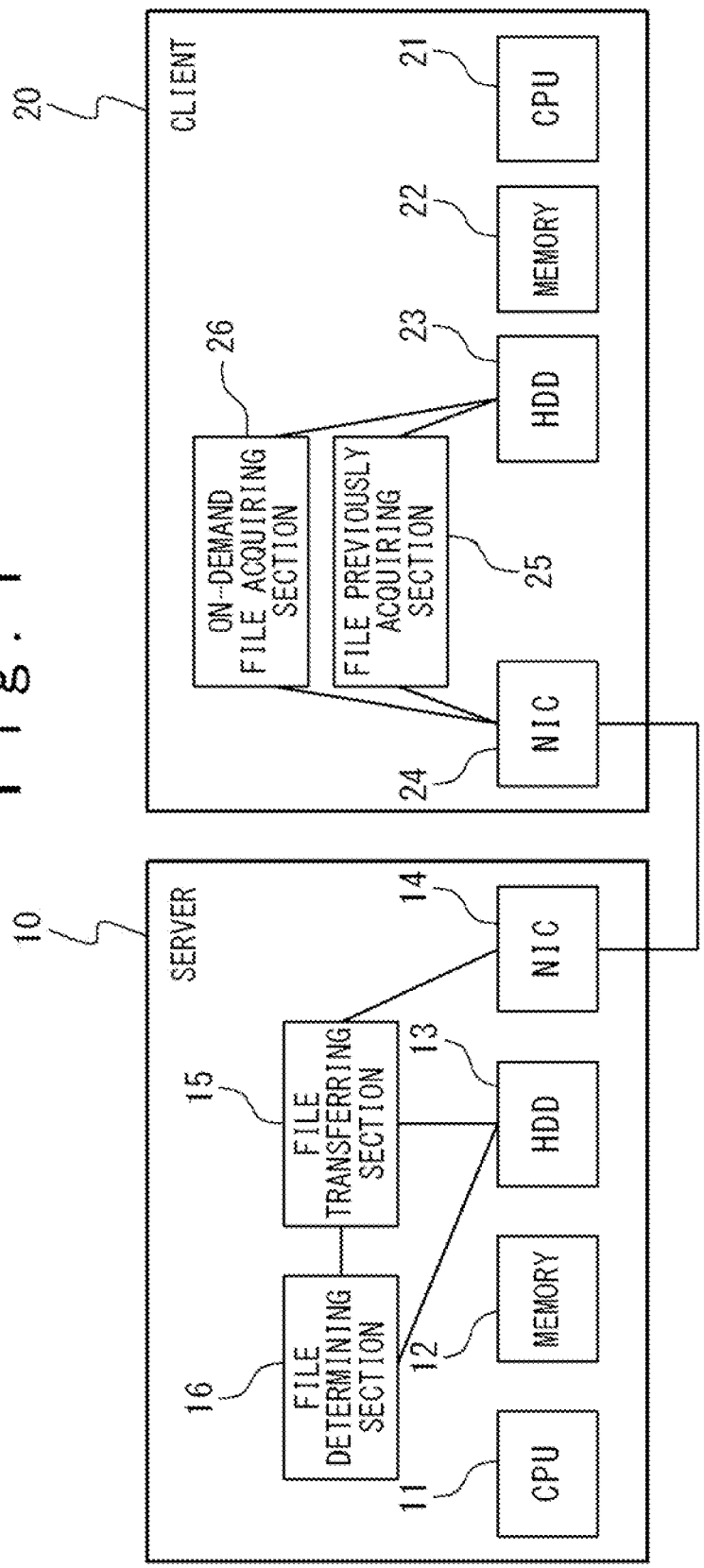
FIG. 1 is a block diagram showing a configuration of a thin client system according to a first exemplary embodiment of the present invention.

Referring to FIG. 1, a thin client system of the present invention is provided with a server 10 and a client 20.

The thin client system is a system in which most of portions of the processing are concentrated on a side of the server 10, resources such as applications and files are managed on the side of the server 10, and the client 20 performs necessary and minimum processing. The server 10 and the client 20 operate based on program control.

As an example of the server 10, a thin client server, a PC (personal computer), a mainframe, a supercomputer and so on are exemplified. As an example of the client 20, a thin client terminal, a mobile notebook PC, a mobile terminal, a work station, information home appliance, OA (Office Automation) equipment and so on are exemplified. It should be noted that the server 10 and the client 20 may be relay units and peripheral units, in addition to the terminal and the server. Also, the server 10 and the client 20 may be configured by an extension board and a software product which are installed on a computer. Also, the server 10 and the client 20 may be configured in virtual machines (VM) environment formed on the computer. Moreover, the server 10 and the client 20 may be installed on mobile bodies such as a vehicle, a ship, and an aircraft. However, actually, they are not limited to these examples.

The server 10 is provided with a CPU (Central Processing Unit) 11, an HDD (Hard Disk Drive) 13, a memory 12, an NIC (Network Interface Card) 14, a file transferring section 15 and a file determining section 16.

The client 20 is provided with a CPU 21, a memory 22, an HDD 23, an NIC 24, a file previously acquiring section 25 and an on-demand file acquiring section 26.

The CPU 11 and the CPU 21 perform the control of various sections related to the computer, and the calculation and processing of data, executes a program stored in the memory, receives data from an input unit and a storage unit, and outputs data to an output unit and the storage unit after the calculation and processing. Also, each of the CPU 11 and the CPU 21 starts an OS (Operating Systems) so that they operate. As an example of the CPU 11 and the CPU 21, a microprocessor and an IC (Integrated Circuit) which has a similar function and so on are exemplified. However, the present invention is not limited to these examples.

The memory 12 and the memory 22 are semiconductor memory units such as RAMs (Random Access memory), ROM (Read Only memory) or a flash memory to be read and written directly by the CPU. Here, the memory 12 and the memory 22 show main memory units. However, the present invention is not limited to these examples.

The HDD 13 and the HDD 23 are auxiliary storage units which store data and programs in and around the computer. Here, the HDD 13 and the HDD 23 are external storages. It should be noted that the HDD 13 and the HDD 23 may be flash memory drives such as SSD (Solid State Drive). Or, the HDD 13 and the HDD 23 may be removable disks such as DVD (Digital Versatile Disk) and storage media such as a SD memory card (Secure Digital memory card). Also, the HDD 13 and the HDD 23 may be peripheral units (external HDD, and so on,) and a storage unit installed in an external server (storage server and so on), or DAS (Direct Attached Storage), FC-SAN (Fiber Channel-Storage Area Network), NAS (Network Attached Storage), IP-SAN (IP-Storage Area Network), in addition to the storage units incorporated in the server 10 and the client 20. However, the present invention is not limited to these examples.

The NIC 14 and the NIC 24 are communication units to transmit and receive data to and from an external device through communication lines (network). Here, the server 10 and the client 20 are connected through the NIC 14 and the NIC 24. As an example of the NIC 14 and the NIC 24, a network adapter and communication ports such as an antenna and a connection port (connector) are exemplified. As an example of the network used by the NIC 14 and the NIC 24, the Internet, a LAN (Local Area Network), a wireless LAN (Wireless LAN), a WAN (Wide Area Network), a backbone (Backbone), a community antenna television system (CATV) line, a fixation telephone network, a mobile telephone network, WiMAX (IEEE 802.16a), 3G (3rd Generation), leased line, IrDA (Infrared Data Association), Bluetooth (registered trademark), a serial communication line, a data bus and so on are exemplified. However, the present invention is not limited to these examples.

The file transferring section 15 receives a file transfer request from a file previously acquiring section 25 or the on-demand file acquiring section 26. In a case of the request from the file previously acquiring section 25, the file transferring section 15 calls the file determining section 16, and acquires a list (transmission file list) in which information of often used files (high use-frequency files) is written. The information of the file is identification information to specify the file. As an example of the information of the file, a file name, a peculiar key word which is contained in the file name, or an extension which is peculiar to the file and so on are exemplified. Next, the file transferring section 15 reads all the files written in a transmission file list from the HDD 13 and transmits the read files to the file previously acquiring section 25. In a case of a request from the on-demand file acquiring section 26, the file transferring section 15 reads the requested file from the HDD 13, and transmits the read file to the on-demand file acquiring section 26.

The file determining section 16 determines previously often used files from the files stored in the HDD 23 to generate a transmission file list, and transfers the generated transmission file list to the file transferring section 15. Here, the previously often used files are files used before start of the OS or at the time of start of the OS. As an example of the previously often used files, a setting file of the OS and application and programs executed at the time of start of the OS and so on are exemplified. However, the present invention is not limited to these examples.

Before the OS starts, the file previously acquiring section 25 transmits a file transmission request to the file transferring section 15, and writes the files received from the file transferring section 15 in the HDD 23. That is, the file previously acquiring section 25 acquires the previously often used files from the file transferring section 15 before the OS starts, and stores the acquired files in the HDD 23.

The on-demand file acquiring section 26 determines whether or not the files requested from the OS have been stored in the HDD 23, after the OS starts. Moreover, when the files requested from the OS have not been stored in the HDD 23, the on-demand file acquiring section 26 transmits a file transmission request to the file transferring section 15, and receives the files from the file transferring section 15 and writes the received files in the HDD 23. That is, when the files requested from the OS have not been stored in the HDD 23 but stored in the HDD 13, the on-demand file acquiring section 26 acquires the files requested from the OS and stored in the HDD 13 from the file transferring section 15 and writes the acquired files in the HDD 23.

It should be noted that the file transferring section 15, the file determining section 16, the file previously acquiring section 25 and the on-demand file acquiring section 26 may be realized as extension boards which are installed into the computer. Or, they may be programs to make the computer and the CPU to execute each function. In this case, the program may be stored in a storage unit and a storage medium. However, the present invention is not limited to these examples.

(Whole Operation)

Figure 2:
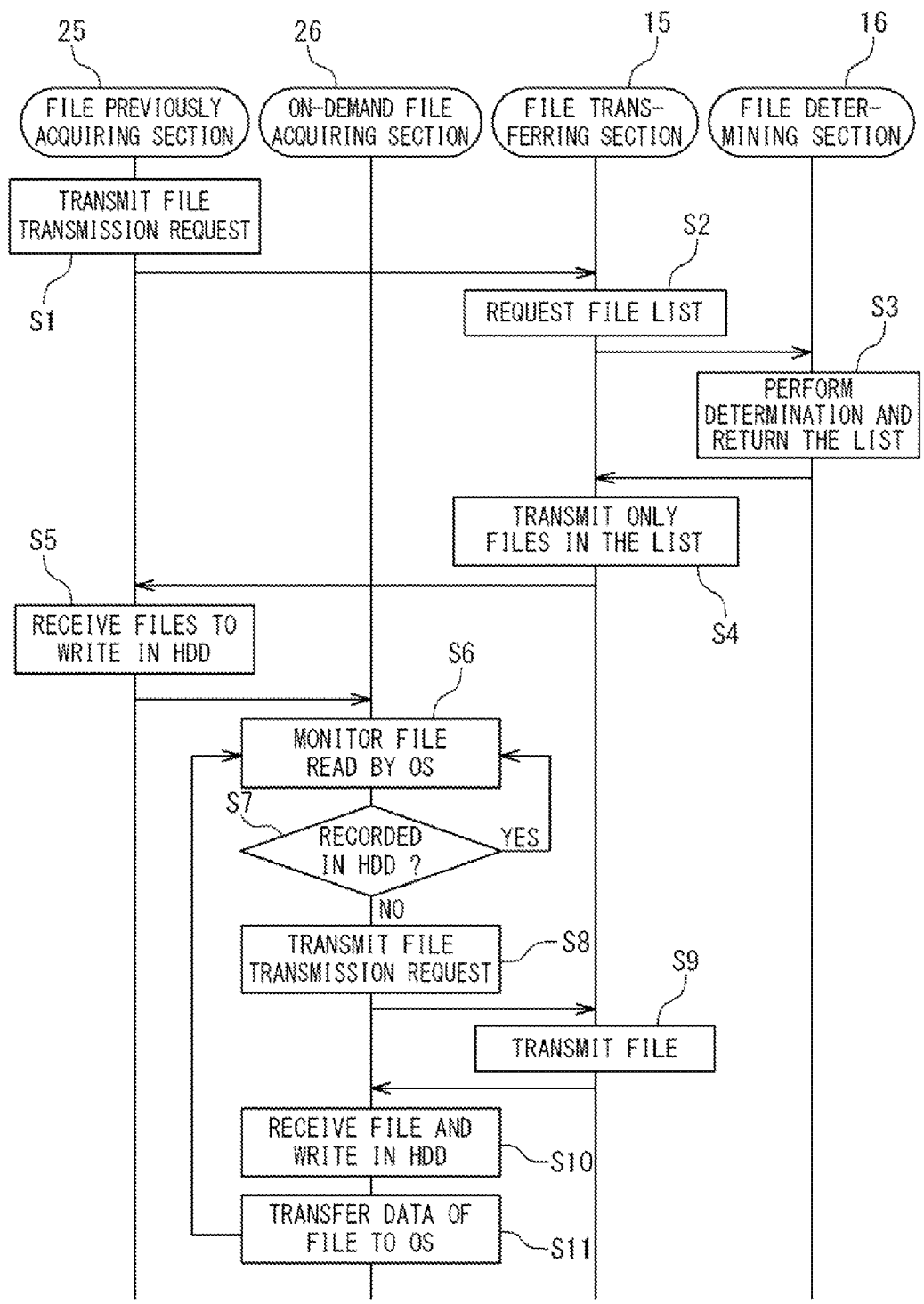
FIG. 2 is a sequence chart showing an operation of the first exemplary embodiment of the present invention.

Next, an operation of the entire thin client system of the present invention will be described in detail with reference to a sequence chart of FIG. 2.

(1) Step S1

The file previously acquiring section 25 transmits the file transmission request to the file transferring section 15 before the OS starts.

(2) Step S2

The file transferring section 15 calls the file determining section 16 in response to the file transmission request. Here, the file transferring section 15 requires a list of files which are previously often used (transmission file list), to the file determining section 16 in response to the file transmission request.

(3) Step S3

The file determining section 16 acquires the list of files which are previously often used (transmission file list), and returns the acquired list (transmission file list) to the file transferring section 15. In this example, the file determining section 16 determines the files which are previously often used, of the files stored in the HDD 23, to generate the transmission file list, and notifies the generated transmission file list to the file transferring section 15. The detailed operation of the file determining section 16 is described later.

(4) Step S4

The file transferring section 15 reads the files written in the received list (transmission file list) from the HDD 13, and transmits the read files to the file previously acquiring section 25. That is, the file transferring section 15 transmits only the files written in the received list (transmission file list) to the file previously acquiring section 25.

(5) Step S5

The file previously acquiring section 25 receives the files from the file transferring section 15 and writes the received files in the HDD 23. After that, the OS starts.

(6) Step S6

When the OS starts, the on-demand file acquiring section 26 monitors the file read by the OS.

(7) Step S7

When the OS tries to read the file from the HDD 23, the on-demand file acquiring section 26 hooks the read operation of the file by the OS, and determines whether or not the file for the read operation by the OS has been stored in the HDD 23.

(8) Step S8

When if is determined that the file for the read operation by the OS has not been stored in the HDD 23, the on-demand file acquiring section 26 transmits a file transmission request to the file transferring section 15.

(9) Step S9

The file transferring section 15 transmits the file requested with the file transmission request to the on-demand file acquiring section 26. In this example, the file transferring section 15 reads the file requested with the file transmission request, of the files stored in the HDD 13, in response to the file transmission request from the on-demand file acquiring section 26, and transmits the read file to the on-demand file acquiring section 26. The on-demand file acquiring section 26 receives the file from the file transferring section 15.

(10) Step S10

The on-demand file acquiring section 26 writes the received file in the HDD 23.

(11) Step S11

The on-demand file acquiring section 26 transfers information of the received file to the OS.

It should be noted that the on-demand file acquiring section 26 may perform the operation to transfer the information of the received file to the OS after writing in the HDD 23 and may perform it before writing in the HDD 23. That is, step S10 and step S11 may be replaced.

(File Determining Operation)

Next, an operation of the file determining section 16 will be described in detail.

The file determining section 16 determines whether the files stored in the HDD 13 are the often used files based on any of the following operations or a combination of them and generates the transmission file list.

(First Determination Operation)

First, the first determination operation of the file determining section 16 will be described.

Figures 3, 4:
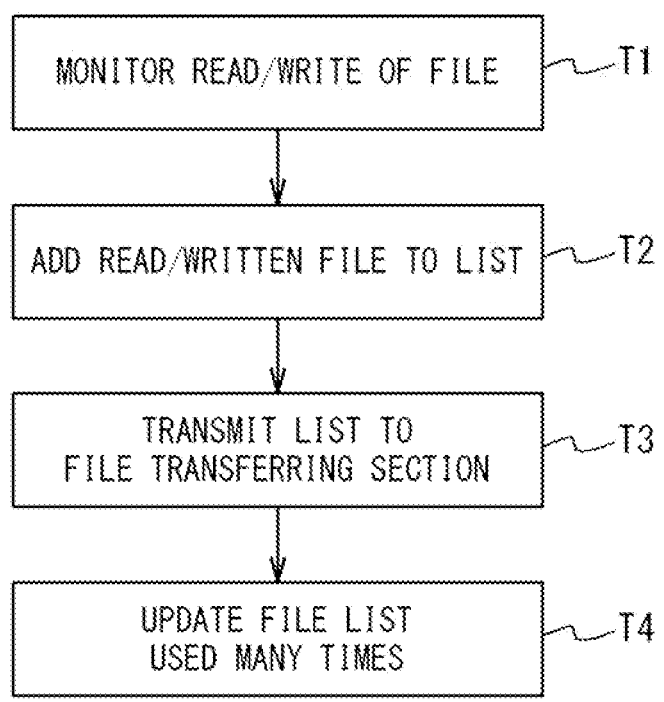
FIG. 3 is a diagram showing a high use-frequency file list.
FIG. 4 is a flow chart showing an updating method of the high use-frequency file list.

The file determining section 16 has a list of the often used files (high use-frequency file list). In the high use-frequency file list, the often used files are defined based on, for example, a path to the file, a directory in which the file has been located, and an extension, as shown in FIG. 3.

When called from the file transferring section 15, the file determining section 16 scans the HDD 13, generates a list in which information of all the files which have been stored in the HDD 13 is written. Also, the file determining section 16 deletes the information of files which is not contained in the high use-frequency file list from a list where the information of all the files which have been stored in the HDD 13 is written, to generate the transmission file list, and transfers the transmission file list to the file transferring section 15. That is, the transmission file list is a list in which information of only files, which are contained in the high use-frequency file list, of all the files which have been stored in the HDD 13 is written.

It should be noted that a manager of the server 10 may generate the high use-frequency file list by using an editor and may generate it automatically as follows.

(Automatic Generating Method of High Use-Frequency File List)

An automatic generating method of the high use-frequency file list will be described with reference to FIG. 4.

(1) Step T1

The on-demand file acquiring section 26 monitors a request of read or write of a file by the OS when the OS is started.

(2) Step T2

When there is the request of read/write of the file by the OS, the on-demand file acquiring section 26 generates a feedback list, and records the file for the request of the read/write in the feedback list. For example, the on-demand file acquiring section 26 stores information such as a file name, and an access time of the file for the request of the read/write in the feedback list.

(3) Step T3

The on-demand file acquiring section 26 transmits the feedback list to the file transferring section 15. For example, the on-demand file acquiring section 26 stops the record into the feedback list in a case of the end of the OS or in a case of reading the predetermined number of files after a predetermined time from the start of the OS, and may transmit the feedback list. However, the present invention is not limited to these examples.

(4) Step T4

The file determining section 16 acquires the feedback list through the file transferring section 15 and updates the high use-frequency file list through either of the following updating operations by using the feedback list.

It should be noted that the timing of update of the high use-frequency file list may be performed each time the OS is started, or for every predetermined constant period such as every day or every week, or at the time at which the manager specifies.

(Update Operation 1)

The file determining section 16 uses the feedback list just as it is, as the high use-frequency file list. That is, the file determining section 16 distributes the files used in case of the start in the last time previously or preliminarily, when the OS starts next.

(Update Operation 2)

The file determining section 16 sorts (classifies) the files written in the high use-frequency file list and the feedback list by an LRU (Least Recently Used) method. Moreover, the file determining section 16 adds the sizes of the files (adds) in order from the head of the high use-frequency file list. When the addition result of the sizes of the files exceeds a size specified by the manager, files subsequent to the file corresponding to the specified size are deleted from a current high use-frequency file list to set as a new high use-frequency file list.

(Update Operation 3)

The file determining section 16 merges (integrates) data of the feedback list for several times in the past. As for a file of the list of merged data, the file determining section 16 generates a file used within a period specified by the manager as a file used recently and stores it in the high use-frequency file list. Specifically, the file determining section 16 compares the date and time determined by subtracting the period specified by the manager from the current data and time and the access date and time contained in the feedback list of merged data. When the access date and time contained in the feedback list is recent, the file of the list of merged data is added to the high use-frequency file list.

(Update Operation 4)

The file determining section 16 generates statistic data from the feedback list for several times in past. As shown in FIG. 5, a file name and the number of times of its use are stored in the statistic data. That is, the statistic data includes the file name and the number of times of use. The file determining section 16 extracts the file used more often than the number of times specified by the manager from the statistic data and sets it as the high use-frequency file list. The manager specifies the feedback list for how many times to generate the statistic data is used. It does not specify in the use number of times. A method may be adopted in which files are sorted in order of more number of times of use and the files are added to the high use-frequency file list from the file having the most number of times of use without the number of times of use, until a total of the sizes of the files written in the high use-frequency file list becomes equal to the file size specified by the manager.

It should be noted that the file determining section 16 may merge a list generated by the manager who thinks to be necessary to preliminarily distribute it, and a list generated automatically through the operations of the update operation 1 to the update operation 4, to set as the high use-frequency file list. For example, the file determining section 16 combines a list generated by the manager and the list generated through the update operation 3. For example, the file determining section 16 describes "c:¥kernel.exe; c:¥config.ini" manually inputted by the manager in a list, and when "c:¥kernel.exe; c:¥patent.doc" has been described in the list generated through the update operation 3, generates a list in which "c:¥kernel.exe; c:¥config.ini; c:¥patent.doc" is described, by merging the two lists. Thus, the list is set as the high use-frequency file list.

(Second Determination Operation)

Next, the second determination the operation of the file determining section 16 will be described.

In the second determination operation, it is assumed that the file that the date and time of update is new is an often used file.

The file determining section 16 analyzes a file system of the HDD 23 and acquires the date and time of update of each of all files. Next, the file determining section 16 regards the files generated after the date and time specified by the manager as the often used files and adds these files to the transmission file list.

The effect of the first exemplary embodiment of the present invention is in that the net boot-type thin client system operating at high speed can be provided by distributing processes of the bottle neck appropriately before an OS operation and during the OS operation.

EXAMPLE 1

Next, a specific example of the first exemplary embodiment of the present invention will be described.

(Basic Configuration)

The server 10 of FIG. 1 is a general computer which is provided with the CPU 11, the memory 12, the HDD 13, and the NIC 14. Similarly, the client 20 is a general computer. The server 10 and the client 20 are connected by the network. The line of the network may be a telephone line, a LAN, a wireless LAN, the Internet and so on and is not especially limited.

The file transferring section 15 is achieved by a program which operates on the server 10. For example, the files stored in the HDD 13 by using FTP (File Transfer Protocol) are transmits to the file previously acquiring section 25 or the on-demand file acquiring section 26. It should be noted that it is possible to use SSH (Secure SHell) and SCP (Secure CoPy) instead of FTP.

The file determining section 16 is achieved by a program which operates on the server 10 and determines whether or not the files stored in the HDD 13 are often used, through an operation to be described later and generates the transmission file list.

The file previously acquiring section 25 and the on-demand file acquiring section 26 are achieved by a program which operates on the client 20.

(Entire Operation)

Next, the entire operation of the thin client system of the present invention will be described.

When the client 20 such as a PC (personal computer) is powered on, first, the file previously acquiring section 25 is executed. For example, the file previously acquiring section 25 transmits a transmission request to the file transferring section 15 by using TCP. At this time, the communication may be encrypted by using IPsec (Security Architecture for Internet Protocol) and TLS (Transport Layer Security).

When receiving the transmission request, the file transferring section 15 calls the file determining section 16. The file determining section 16 generates the transmission file list. The details will be described later.

When receiving the list, the file transferring section 15 reads the files written in the transmission file list from the HDD 13 and transmits these files to the file previously acquiring section 25. For example, it is considered to use a FTP and so on for the transmission. The file previously acquiring section 25 writes the received files in the HDD 23.

Next, the CPU 21 starts the OS having been written in the HDD 23. The OS may be such as the "Windows" (registered trademark) and "Linux" (registered trademark), "FreeBSD" (registered trademark) and is not especially limited to them.

For example, the on-demand file acquiring section 26 is installed as a driver of the OS. In case of "WINDOWS" (registered trademark), the read/write request to the HDD 23 can be monitored by installing the on-demand file acquiring section 26 as an upper-layer driver of NTFS (NT File System). Also, the on-demand file acquiring section 26 can determine whether or not the requested file exists on the HDD 23 based on a message returned from NTFS as a lower-layer driver.

For example, when the lower-layer NTFS driver returns a message of request success, the on-demand file acquiring section 26 transfers the message to an upper-layer driver just as it is.

Also, when the lower-layer NTFS driver returns a message indicating that the file does not exist, the on-demand file acquiring section 26 sends a file transmission request to the file transferring section 15 and acquires the file. Then, the on-demand file acquiring section 26 calls the NTFS driver to write the file in the HDD. Next, the on-demand file acquiring section 26 calls the NTFS driver and issues an access request to the written file. When the request succeeds, the on-demand file acquiring section 26 replaces the message returned earlier from the NTFS driver or the message that the file does not exist with the message of the request success and returns the result to the upper-layer driver.

The on-demand file acquiring section 26 repeatedly performs the above operation while the OS operates.

(File Determining Operation)

Next, an operation of the file determining section 16 will be specifically described.

For example, in case of "Linux" (registered trademark), a list of files of the HDD 13 can be acquired by using the "find command". The list of files of the HDD 13 contains information of all of files stored in the HDD 13. Next, the file determining section 16 deletes information of the files which are not contained in the high use-frequency file list, from the list of files in the HDD 13, and generates the transmission file list. Then, the file determining section 16 transfers the transmission file list to the file transferring section 15.

The high use-frequency file list is generated in the following methods.

When there is a file read/write request from the upper-layer driver, the on-demand file acquiring section 26 records the name of the requested file into a feedback list.

For example, the feedback list includes a file name and access date and time as follows.
2008/4/1 12:00:01 C:¥a.txt;
2008/4/1 12:01:01 C:¥b.dll;

For example, the on-demand file acquiring section 26 transmits the list to the file transferring section 15 when the OS ends. For example, the FTP and so on can be used for the transmission. The transmission to the feedback list may be performed 5 minutes later from the start of the OS or when the file is read for "10 Mbytes"; in addition to the end of the OS.

For example, the file transferring section 15 counts the number of times of reference to the file contained in the past feedback lists for three times in the past and generates statistic data indicating how many times which the file is used. For example, when:
feedback list 1="a.txt;b.txt",
feedback list 2="b.txt", and
feedback list 3="a.txt; b.txt; c.txt",
the statistic data are "a.txt=2 times", "b.txt=3 times", and "c.txt=one time". Here, for example, supposing that the manager specifies "equal to or more than 2 times", the high use-frequency file list is "a.txt; b.txt".

In the above example, the number of times is specified, but a file capacity may be specified as "previously transmitting for 110 Mbytes". In this case, the file transferring section 15 sorts "a.txt", "b.txt" and "c.txt" based on the number of times of use, and obtains "b.txt; a.txt; c.txt". For example, when "a.txt=40 Mbytes", "b.txt=70 Mbytes", and "c.txt=1 Mbytes", the file transferring section 15 adds files to the high use-frequency file list from the head file. Until the total number of sizes of files written in the high use-frequency file list exceeds the size specified by the manager, the file transferring section 15 adds files to the list. In the above example, the high use-frequency file list becomes "b.txt; a.txt".

Apart from the above example, the manager may specify a period and the file transferring section 15 may add the files used in the specified period to the list. For example, it is assumed that the latest feedback list is "2008/4/2 13:00:01 C:¥a.txt; 2008/4/2/12:01:01 C:¥b.dll;" and the feedback list before once is "2008/4/1 13:00:01 C:¥c.txt; 2008/4/1/12:01:01 C:¥d.dll;", and the current time is "2008/4/3 12:30:00". At this time, when the manager specifies 48 hours, the file transferring section 15 generates a list of files used within 48 hours "C:¥a.txt; C:¥b.dll; C:¥c.txt;", as the high use-frequency file list.

The file determining section 16 may perform the determination by using the information of date without using the high use-frequency file list. For example, it is possible to acquire a list of files which are generated or updated after a specific date and time by using the "find command" in case of "Linux" (registered trademark). The file determining section 16 may generate the list of files generated after the date and time specified by the "find command", and transfer the list of files to the file transferring section 15 as the transmission file list.

EXAMPLE 2

Next, another operation of the first exemplary embodiment of the present invention will be described.

In the operation of the above example, the file is acquired by the on-demand file acquiring section 26 when there is a file request from the OS. At this time, before the file request reaches from the OS, it may acquire a file.

The on-demand file acquiring section 26 transmits a file transmission request to the file transferring section 15 when the use rates of the HDD 23 and the NIC 24 are low.

The file transferring section 15 reads the files which are not written in the transmission file list from the HDD 13, and transmits the read files. At this time, the file transferring section 15 may transmit more primarily the files having the earlier access date and time by using the information of the access date and time which are written in the feedback list.

In case of this operation, because the advanced read of the file is performed, the OS can be operated at high speed.

EXAMPLE 3

Next, another operation of the first exemplary embodiment of the present invention will be described.

In the operation of the above example, it is determined whether or not the file is often used in units of files and the file is transmitted in units of files. At this time, it may be determined whether or not the file is often used in not units of files but units of sectors and the file may be transmitted in units of sectors. When this operation is performed, the image of the HDD which should be sent to the client is stored in the HDD 13.

It should be noted that the sector is a minimum record unit in a disk-type storage unit. A group of some sectors is called a "cluster". Therefore, actually, the transmission may be performed in units of clusters in addition to the transmission in units of sectors.

The file transferring section 15 extracts the sectors of a transmission sector list from the HDD image and transmits data in the extracted sectors to the file previously acquiring section 25. At this time, the file transferring section 15 generates a list (non-transmitted sector list) where information of the sector in which data is not transmitted to the file previously acquiring section 25 is written, and may transmit the non-transmitted sector list to the file previously acquiring section 25.

The file determining section 16 has a high use-frequency sector list in which often used sectors are written, not the high use-frequency file list when processing in units of sectors. When being called from the file transferring section 15, the file determining section 16 generates a list in which information of all sectors is written. The information of the sector is identification information to specify the sector. As an example of the information of the sector, the sector number and so on are exemplified. Also, the file determining section 16 deletes information of the sectors which are not contained in the high use-frequency sector list from the list where information of all sectors is written and generates a transmission sector list, and transfers the transmission sector list to the file transferring section 15. That is, the transmission sector list is obtained by deleting information of the sectors which is not contained in the high use-frequency sector list from the list in which information of all sectors is written.

The file transferring section 15 reads the sectors of the list from the HDD image of the HDD 13 and transmits them to the file previously acquiring section 25.

The file previously acquiring section 25 writes data of the received sectors in the sectors of the same positions of the HDD 23. The file previously acquiring section 25 generates dummy data with a specific pattern and stores in the sector which is not received. Or, the file previously acquiring section 25 may receive the non-transmitted sector list from the file transferring section 15, and generate the dummy data with the specific pattern to record, with respect to the sectors which are written in the non-transmitted sector list.

When there is a read request to the HDD 23 from the OS, the on-demand file acquiring section 26 transmits a transmission request of the sector data to the file transferring section 15, when the read sector data has the pattern of the dummy data.

The file transferring section 15 transmits the requested sector data in response to the sector transmission request. Here, the file transferring section 15 detects the requested sector data from the sectors of the HDD 13 and transmits the detected sector data.

The on-demand file acquiring section 26 overwrites the received sector data on the corresponding sectors of the HDD 23.

Next, the on-demand file acquiring section 26 returns the received sector data to the read request from the OS.

In case of this operation, the feedback list is written in units of sectors. The on-demand file acquiring section 26 adds the access date and time and the sector number to the feedback list. A method of updating the high use-frequency sector list from the feedback list is performed in the same way as in units of files and accordingly the description is omitted. That is, the method of updating the high use-frequency sector list is same as the method of updating the high use-frequency file list.

For example, the file transferring section 15 and the file previously acquiring section 25 perform the transmission and acquisition in units of sectors. The file determining section 16 transfers the high use-frequency sector list in which the sector numbers such as "1", "2", "3", "45", and "567" are stored to the file transferring section 15. The file transferring section 15 transfers the list as pairs of the sector number and the data, like "secNo=1, data=abcde...;", "secNo=2, data=fghij...;". For example, use of FTP and so on for transfer is considered. The file previously acquiring section 25 writes the received data in the sectors ("1", "2", "3", "45", and "567") of the HDD 23. Also, the file previously acquiring section 25 writes dummy data with the specific pattern in the sectors except for the above sectors. For example, the specific pattern may be any pattern if not being the patterns which emerge often into the file, such as all "0" or all "1".

The on-demand file acquiring section 26 compares whether or not the pattern of the data in the sector is coincident with the specific pattern when reading one sector. When being coincident with each other, the on-demand file acquiring section 26 acquires data in the sector from the file transferring section 15. For example, when reading the "$4^{th}$" sector, because the specific pattern of the dummy data is stored in the "4th" sector, the on-demand file acquiring section 26 acquires the "4th" data from the file transferring section 15. Next, the on-demand file acquiring section 26 writes the acquired data in the "4th" sector of the HDD 23. Then, the on-demand file acquiring section 26 replaces the data to be transferred to the OS with the received sector data in place of data of the specific pattern.

EXAMPLE 4

Next, another operation of the first exemplary embodiment of the present invention in the more will be described.

In the operation of the above example, by writing a dummy pattern, whether or not data in the sector is received is determined when the OS read the sector. However, the determination may be performed by having a list of the non-received sector (non-received sector list) without writing the dummy pattern. That is, in the operation of the above example, through the comparison with the pattern of the dummy data, whether or not the read sector data is dummy data is determined, to acquire data in the sector. However, by referring to the list of non-received sectors without writing the dummy data, the data may be acquired.

In this case, the file previously acquiring section 25 generates a list (non-received sector list) of non-transmitted sectors which are not transmitted from the file transferring section 15. The on-demand file acquiring section 26 hooks a sector read request from the OS, and transmits a transmission request to the file transferring section 15, when the sector is recorded in the non-received sector list. Then, the on-demand file acquiring section 26 receives data in the sectors and deletes the sectors from the non-received sector list.

The file transferring section 15 transmits a set of the total number of sectors of the HDD image, the sector number, and the data to the file previously acquiring section 25.

The file previously acquiring section 25 writes the sector number of the sector from which data is not received, within the total number of the sectors into the list. For example, the file previously acquiring section 25 generates a non-received sector list when the total number of sectors is "5", and when receiving a set of the sector number and the data, "secNo=1, data=abcde . . . ;", "secNo=2, data=fghij . . . ", "secNo=4, data=fghij . . . ;". Thus, the file previously acquiring section 25 stores data of the sector numbers "3" and "5" in the non-received sector list.

When hooking a read request to the sector number "5" from the OS, the on-demand file acquiring section 26 confirms that the sector is in the list and acquires data in the sector from the file transferring section 15. Then, the on-demand file acquiring section 26 deletes information of the sector from the non-received sector list and sets the non-received sector list to "3".

[Second Exemplary Embodiment]

Next, a second exemplary embodiment of the present invention will be described in detail. The exemplary embodiment is different from the first exemplary embodiment of the present invention in that VMM (Virtual Machine Monitor) is provided which is software to generate a virtual machine (VM).

(Basic Configuration)

Referring to FIG. 6, the thin client system of the present invention is provided with the server 10 and the client 20.

The server 10 is provided with the CPU 11, the memory 12, the HDD 13, the NIC 14, the file transferring section 15 and the file determining section 16.

The client 20 is provided with the CPU 21, the memory 22, the HDD 23, the NIC 24, the file previously acquiring section 25, the on-demand file acquiring section 26 and the VMM 27.

The server 10, the client 20, the CPU 11, the memory 12, the HDD 13, the NIC 14, the file transferring section 15, the file determining section 16, the CPU 21, the memory 22, the HDD 23, the NIC 24, the file previously acquiring section 25 and the on-demand file acquiring section 26 are basically the same as those of the first exemplary embodiment of the present invention.

The VMM 27 generates virtual machines (VM).

The HDD 13 of the server 10 records the virtual HDD data which is used in the virtual machine (VM) as a VM disk image. The file transferring section 15 can transmit files of the VM disk image by analyzing the file system of the VM disk image.

(Whole Operation)

Referring to FIG. 7, the entire operation of the present exemplary embodiment will be described. Steps U1 to U3 are the same as steps S1 to S3 in the first exemplary embodiment of the present invention.

(1) Step U1

The file previously acquiring section 25 transmits the file transmission request to the file transferring section 15.

(2) Step U2

The file transferring section 15 calls the file determining section 16 in response to the file transmission request. Here, the file transferring section 15 requires a list of previously often used files (transmission file list) to the file determining section 16 in response to the file transmission request.

(3) Step U3

The file determining section 16 acquires the list of previously often used files (transmission file list) and returns the acquired list (transmission file list) to the file transferring section 15. In this example, the file determining section 16 determines previously often used files of the files stored in the HDD 23 and generates the transmission file list, and notifies the transmission file list to the file transferring section 15.

(4) Step U4

The file transferring section 15 receives the transmission file list from the file determining section 16, and reads the files written in the list from the VM disk image and transmits it to the file previously acquiring section 25. Moreover, the file transferring section 15 acquires names of the files and the sizes of the files which are not written in the transmission file list of the files which is stored in the VM disk image, and transmits them to the file previously acquiring section 25.

(5) Step U5

The file previously acquiring section 25 generates a VM disk image in the HDD 23. Next, the file previously acquiring section 25 analyzes the VM disk image and writes the received file in the VM disk image. Also, the file previously acquiring section 25 generates a dummy file when receiving a file name and a file size. That is, the file previously acquiring section 25 writes often used files in the HDD 23 when receiving the often used files. Also, the file previously acquiring section 25 writes the dummy data in the HDD 23, otherwise.

(6) Step U6

When the above-written processing (step U5) by the file previously acquiring section 25 ends, the VMM 27 generates a virtual machine (VM) and starts an OS on the virtual machine (VM). At this time, when detecting the end of the processing by the file previously acquiring section 25 by monitoring the operation of the file previously acquiring section 25, or in response to a processing end notice from the file previously acquiring section 25, it is desirable that the VMM 27 generates the virtual machine (VM) and starts an OS on the virtual machine (VM). However, actually, the present invention is not limited to these examples. At this time, the on-demand file acquiring section 26 waits for a disk read request (access request) from the VMM 27.

(7) Step U7

When receiving an access instruction, the on-demand file acquiring section 26 determines whether or not the file corresponding to the access request has been stored in the HDD 23. In this example, when a signature list exists, the on-demand file acquiring section 26 refers to the signature list to determine whether or not the data in the sector read from the HDD 23 is dummy data. The signature list will be described later in detail. When the signature list does not exist, the on-demand file acquiring section 26 automatically determines that data in the sector read from the HDD 23 are not the dummy data. When the data in the sector read from the HDD 23 is the dummy data, the on-demand file acquiring section 26 shows that the file corresponding to the access request has not been stored in the HDD 23. When the data in the sector read from the HDD 23 is the dummy data, the on-demand file acquiring section 26 specifies from the signature list, which of files is accessed to.

(8) Step U8

Then, the on-demand file acquiring section 26 transmits the file transmission request corresponding to the access request to the file transferring section 15.

(9) Step U9

The file transferring section 15 transmits the requested files to the on-demand file acquiring section 26 in response to the file transmission request corresponding to the access request.

(10) Step U10

Next, the on-demand file acquiring section 26 receives the files from the file transferring section 15 and overwrites the dummy data in the HDD 23 with the data of the received files.

(Method of Producing Dummy File)

Referring to FIG. 8, a method of producing a dummy file at step U5 will be described.

(1) Step V1

First, the file previously acquiring section 25 generates a signature which is peculiar to each file. The size of the signature may have any value if it is within the sector size of the HDD 23. When the size of the signature is equal to the sector size of the HDD 23, the file previously acquiring section 25 generates dummy data as the signature. When the size of the signature is smaller than the sector size of the HDD 23, the file previously acquiring section 25 adds a padding to the signature and generates the dummy data having a size which is equal to the sector size.

(2) Step V2

Next, the file previously acquiring section 25 writes the dummy data in each sector of the file instead of the data of the file.

(3) Step V3

Lastly, the file previously acquiring section 25 generates a signature list of the file and the signature contained in the written dummy data. In this example, the file previously acquiring section 25 adds a set of a signature and a file name to the signature list and stores the signature list in the HDD 23. An example of the signature list is shown in FIG. 9.

(On-Demand File Acquiring Operation)

Referring to FIG. 10, the detailed operation of the on-demand file acquiring section 26 in step U10 will be described.

(1) Step W1

When receiving a file, the on-demand file acquiring section 26 analyzes a file system of the VM disk image. Which of the sections the file corresponding to the access request is stored is specified. That is, the on-demand file acquiring section 26 analyzes the file system of the VM disk image and specifies the sectors of the file corresponding to the access request.

(2) Step W2

Next, the on-demand file acquiring section 26 selects a sector at the head of the file as a sector of the rewrite object. That is, the on-demand file acquiring section 26 sets the sector at the head of the file to the rewrite object.

(3) Step W3

Then, the on-demand file acquiring section 26 confirms whether or not the signature has been stored in the data in the sector of the rewrite object. In this example, through the pattern matching with the signature list, the on-demand file acquiring section 26 confirms whether or not the signature has been stored in the data of the sector of the rewrite object.

(4) Step W4

When the signature has been stored in the data of the sector of the rewrite object, the on-demand file acquiring section 26 writes data for the sector size of the HDD 23 from the head of the received file into the sector of the rewrite object, because the dummy data has been stored in the sector of the rewrite object.

(5) Step W5

Then, the on-demand file acquiring section 26 confirms whether or not all the sectors of the file have been processed. At this time, the on-demand file acquiring section 26 ends the processing when all the sectors of the file have been processed.

(6) Step W6

When the processing of all the sectors of the file is not ended, the on-demand file acquiring section 26 newly specifies a sector next to the sector of the rewrite object as the sector of the rewrite object. That is, when the processing of all the sectors of the file is not ended, the on-demand file acquiring section 26 newly sets the sector next to the sector of the rewrite object to the rewrite object.

It should be noted that the on-demand file acquiring section 26 processes the next sector, in the same way as the first sector at step W3 and step W4. However, in case to write data at step W4, it is supposed that the object sector is an "$i^{th}$" sector of the file, and the sector size of the HDD 23 is "S". At this time, the on-demand file acquiring section 26 writes data from the "$(i \times S+1[bytes])^{th}$" sector to the "$((i+1) \times S+1[byte])^{th}$" sector in the file.

A file system of the VM disk image cannot be mounted in double to keep consistence. In other words, the VM image can be mounted before the OS starts, but it cannot be mounted after the OS starts, because it is mounted by the OS. Therefore, the file previously acquiring section 25 can mount the VM disk image and write the data in units of the files. The on-demand file acquiring section 26 can only rewrite the file content in units of sectors. Therefore, the dummy file is generated at step U5 and the contents of the sectors in which the content of the dummy file is recorded are rewritten at step U1.

In the above-written operation, whether or not the dummy data has been stored in the read sector is determined based on the signature in the dummy data written in each sector of the HDD. The file previously acquiring section 25 generates a list (dummy data list) of the sectors in which the dummy data are written, when writing not the signature but the dummy data in the HDD 23. The on-demand file acquiring section 26 may determine whether or not the dummy data has been stored in the read sector by referring to the list (dummy data list).

Below, the operation of each section of the present exemplary embodiment will be described in detail.

The file previously acquiring section 25 does not generate the signature, but generates "0" as the dummy data and writes a file in the HDD 23. Next, the file previously acquiring section 25 collects information in which sectors the file is recorded by analyzing a file system and determines names (file names) of the files, whose contents are the dummy data, and a list (dummy data list) in which the sector numbers have been recorded.

The on-demand file acquiring section 26 hooks a sector read request to the HDD 23 by the VMM 27, and confirms whether or not the sector of a read object has been written in the dummy data list. When the sector of the read object has not been written in the dummy data list, the on-demand file acquiring section 26 reads the object sector from the HDD 23 and transfers it to the VMM 27. When the sector of the read object has been written in the dummy data list, the on-demand file acquiring section 26 specifies from the dummy data list, that the object sector is a part of which file. Next, the on-demand file acquiring section 26 acquires the specified file from the file transferring section 15. Then, the on-demand file acquiring section 26 stores the acquired file in the sectors written in the dummy data list. Lastly, the on-demand file acquiring section 26 transfers the data in the sector requested by the VMM 27 to the VMM 27.

In the operation of the above second exemplary embodiment, the file previously acquiring section 25 and the on-demand file acquiring section 26 acquires in units of files from the file transferring section 15. Like another operation of the first exemplary embodiment of the present invention, the operation may be performed not in units of files but in units of sectors. The operations of the file previously acquiring section 25, the on-demand file acquiring section 26 and the file transferring section 15 are the same as those of the first exemplary embodiment of the present invention, and the description is omitted.

The effect of the second exemplary embodiment is in that a method of implementing a net boot type thin client system at a high-speed operation can be applied to the virtual PC system.

EXAMPLE 5

Next, a specific example of the second exemplary embodiment of the present invention will be described.

The difference between the first exemplary embodiment and the second exemplary embodiment in the present invention is in the operation of writing of a file by the file previously acquiring section 25 and the on-demand file acquiring section 26. The operation will be specifically described.
(File Preliminarily Acquiring Operation)

First, the operation of the file previously acquiring section 25 will be described.

The file transferring section 15 transmits files based on the transmission file list received from the file determining section 16 before the OS starts. Moreover, the file transferring section 15 transmits a list of file sizes and the file names of the files except for the above files.

For example, the list will be described as follows:
"name=c:¥a.txt size=10 bytes;
name=c:¥b.exe size=1000 bytes; . . . ".

For example, in order to transmit a file and a list, the use of FTP and so on is exemplified.

The file previously acquiring section 25 writes the file received from the file transferring section 15 in the HDD 23. Then, in the following way, the file previously acquiring section 25 generates a dummy file.

For example, the file previously acquiring section 25 generates a signature by using the random number. As the size of the signature, an optional length to the sector size of the HDD 23, e.g. "512 bytes" is exemplified. When the size of the signature is not equal to the size of the sector in the HDD 23, the file previously acquiring section 25 adds 0 as a padding behind the signature and generates the dummy data with the sector size in the HDD. For example, the file previously acquiring section 25 adds the padding of "448 bytes" when the signature is "64 bytes".

Next, the file previously acquiring section 25 writes the dummy data in the HDD 23. For example, in a FAT (File Allocation Tables) file system, when the sector size of the HDD is "512 bytes", the file of "1500 bytes" uses three sectors. The file previously acquiring section 25 stores the dummy data in these three sectors. Moreover, the file previously acquiring section 25 stores the generated signature and the file name in the signature list. For example, the file previously acquiring section 25 adds to the first line in the list of FIG. 9 when "ABCDEF . . . " is generated to the file of "C:¥a.txt".

After the file previously acquiring section 25 writes all the dummy files in the HDD 23, the OS is started. For example, after writing all the dummy files in the HDD 23, the file previously acquiring section 25 issues a start request of the OS to the CPU 21. The CPU 21 starts the OS in response to the start request of the OS.
(On-Demand File Acquisition Operation)

Next, the operation of the on-demand file acquiring section 26 will be specifically described.

The on-demand file acquiring section 26 monitors a read operation by an OS in units of sectors. Then, the on-demand file acquiring section 26 confirms whether or not the content of the sector includes a signature when a specific sector is read from the HDD 23.

For example, the VMM 27 is "Xen" and "VMWare (registered trademark)".

For example, if the VMM 27 is "Xen", by monitoring "qemu-dm" (QEMU device model program) which is a program of generating a virtual hard disk, the read operation by the HDD 23 can be monitored. QEMU is a program which can emulate the CPUs of many types. For the determination of whether or not the signature is included, it is sufficient to compare each line of the signature list for the size of the signature from the head of the sectors, when the file system used in VM is FAT.

The on-demand file acquiring section 26 transfers information of the sector to the VMM 27 when the read sector data is not the dummy data. Also, when the data of the read sector is the dummy data, the on-demand file acquiring section 26 acquires a file from the file transferring section 15. For example, for the acquisition, use of FTP and so on is exemplified. For example, if the file system which is used in the VM is FAT, the sectors in which a file is stored can be determined from directory entries and FAT entries. The on-demand file acquiring section 26 divides the file acquired from the file transferring section 15 in units of "512 bytes" and writes them in the sectors of the file in order from the head. Lastly, the on-demand file acquiring section 26 transfers data in the sectors to a read request from the VMM 27 to the VMM 27.

Next, in the present exemplary embodiment, like the first exemplary embodiment of the present invention, the data acquisition may be performed in units of sectors. The specific operation is same as the first exemplary embodiment of the present invention.

Also, in the present exemplary embodiment, like the first exemplary embodiment of the present invention, whether or not the sector is a non-received sector is determined by using not the pattern of the dummy data but a non-received sector list. The specific operation is same as the first exemplary embodiment of the present invention.

It should be noted that the exemplary embodiments of the present invention may be combined.

The present invention can be applied to the information leakage measure by using the thin client system.

<Points>

Lastly, the features of the present invention will be described.

In the thin client system of the present invention, a first computer used by a user acquires a file from a second computer. The first computer is provided with a file previously acquiring section configured to acquire the file before an OS operates and an on-demand file acquiring section configured to acquire the file requested by the OS while the OS operates. The second computer is provided with a file determining section configured to generate a list of files received by the file previously acquiring section, and transmit the files of the list to the file previously acquiring section. Moreover, the second computer is further provided with a file transferring section configured to transmit the files requested from the on-demand file acquiring section to the on-demand file acquiring section.

Also, the thin client system of the present invention is provided with a first computer used by a user acquires files from a second computer. The first computer is provided with a virtual machine monitor configured to generate a virtual machine (VM), a file previously acquiring section configured to acquire the files before the virtual machine (VM) operates, and generate the files having dummy data to files have not been acquired before the virtual machine (VM) operates, and an on-demand file acquiring section configured to acquire the data of the file requested by the virtual machine (VM) while the virtual machine (VM) operates, to replace the dummy data of the file by the acquired data. The second computer is provided with a file determining section configured to generate a list of files received by the file previously acquiring section, and transmit the files of the list to the file previously acquiring section. Moreover, the second computer is further provided with a file transferring section configured to transmit the files requested from the on-demand file acquiring section to the on-demand file acquiring section.

At this time, the file previously acquiring section generates dummy data with a specific pattern for every file, and generates a list of sets of a pattern and a file name for every file. The on-demand file acquiring section compares the list with information of sectors read from a hard disk, retrieves a file name from the list when the pattern of the data is written in the list, and acquires the data of the file from the file transferring section.

It should be noted that the on-demand file acquiring section replaces only the data of the file without rewriting the information of the file system.

Also, the thin client system of the present invention with the first computer used by a user being the system by which the data in the sector of the hard disk is acquired from the second computer, a first computer is provided with the file previously acquiring section configured to acquiring data in the sector before the OS operates and the on-demand file acquiring section configured to acquiring data in the sector requested by the OS while the OS operates. The second computer is provided with a file determining section configured to generate a list of sectors received by the file previously acquiring section, and transmit the sectors of the list to the file previously acquiring section, and a file transferring section configured to transmit the sectors requested from the on-demand file acquiring section to the on-demand file acquiring section.

Also, the thin client system of the present invention is provided with a first computer used by a user and acquiring data in sectors of a hard disk from a second computer. The first computer is provided with a virtual machine monitor configured to generate a virtual machine (VM), a file previously acquiring section configured to acquire the data in the sectors before virtual machine (VM) operates, and an on-demand file acquiring section configured to acquire the data in the sectors requested by the virtual machine (VM) while the virtual machine (VM) operates. The second computer is provided with a file determining section configured to generate a list of the sectors received by the file previously acquiring section, transmit the sectors of the list to the file previously acquiring section, and a file transferring section configured to transmit the sectors requested from the on-demand file acquiring section to the on-demand file acquiring section.

At this time, the file previously acquiring section generates dummy data with a specific pattern. The on-demand file acquiring section determines whether or not the data in the sectors is dummy data by determining whether or not the data of the sector read from the hard disk includes a pattern, and acquires the data in the sector from the file transferring section in case of dummy data.

Moreover, the file transferring section generates a list of files or sectors which have not been transmitted to the file previously acquiring section and transmits the list to the file previously acquiring section. The file previously acquiring section generates the dummy data to the files or the sectors written in the list.

Or, the file previously acquiring section generates a list of sectors which have not been acquired. The on-demand file acquiring section confirms whether or not the sector to be read from the hard disk has been written to the list and acquires the data in the sector from the file transferring section when the sector has been written.

The file determining section transfers the list given from a manager to the file transferring section.

Or, the file determining section receives a use situation of the files from the on-demand file acquiring section, generates a list of files with high use-frequency, and transfers the list to the file transferring section.

Or, the file determining section receives the use situation of the files from the on-demand file acquiring section, generates a list of files used recently, and transfers the list to the file transferring section.

Or, the file determining section generates a list of files in which the update date and time is newer than the date and time specified by the manager, and transfers the list to the file transferring section.

Or, the file determining section merges the list given from the manager and the list generated through the above operation, and transfers the merged list to the file transferring section.

<Summary>

As described above, the thin client system of the present invention is provided with the file previously acquiring section configured to acquiring a file before the OS starts, and the on-demand file acquiring section configured to acquire a file while the OS operates, on a client side; and a file determining section configured to determine whether or not the file is a high use-frequency file on a server side. The subject matter of the present invention can be achieved by adopting the configuration and by downloading the files with high use-frequency before the OS starts, and by downloading files with low use-frequency in on-demand.

In this example, a case to exchange files and data by communication using an NIC has been described. However, actually, it is possible to store the files and data in a USB memory and a storage medium such as DVD and exchange the files and the data through the storage medium. In this case, instead of the NIC, connection ports (connector) such as the USB ports and reading units such as a DVD drives and so on are used.

Also, here, the description is made by using the files and data in the sector as an example, but actually, unit data other than the file and the data in the sector may be used. The unit data is desirable to be the minimum unit of the data when the server and the client store and transmit and receive.

The above exemplary embodiments of the present invention have been described in detail. However, actually, the present invention is not limited to the above exemplary embodiments and any modifications in a range within the spirit of the present invention are contained in the present invention.

The present application is the National Phase of PCT/JP2010/050012, filed Jan. 5, 2010, which claims a priority on convention based on Japanese Patent Application No. 2009-001372, and the disclosure thereof is incorporated herein by reference.

The invention claimed is:

1. A thin client system comprising:
a first computer used by a user; and
a second computer configured to provide unit data to said first computer through a network by which said first computer and second computer are separated,
wherein said first computer comprises:
a first memory section configured to store the unit data provided from said second computer;
a unit data previously acquiring section configured to acquire the unit data from said second computer before an OS (Operating System) of said first computer operates; and
an on-demand unit data acquiring section configured to acquire the unit data requested by said OS from said second computer while said OS operates, and
wherein said second computer comprises:
a second memory section configured to store the unit data provided from said first computer;
a unit data determining section configured to generate a transmission file list in which identification information to specify the unit data acquired by said unit data previously acquiring section is written before said OS operates, the transmission file list not including files listed in the transmission file list themselves; and
a unit data transferring section configured to transmit the unit data whose information is written in said transmission file list before said OS operates to said unit data previously acquiring section and transmit the unit data requested from said on-demand unit data acquiring section while said OS operates to said on-demand unit data acquiring section.

2. The thin client system according to claim 1, wherein said first computer further comprises a virtual machine monitor which generates a virtual machine,
wherein said unit data previously acquiring section acquires the unit data before said virtual machine operates,
wherein said on-demand unit data acquiring section acquires the unit data requested by said virtual machine while said virtual machine operates,
wherein said unit data determining section writes the information of the unit data acquired by said unit data previously acquiring section before said virtual machine operates into said transmission file list, and
wherein said unit data transferring section transmits to said unit data previously acquiring section, the unit data whose information is written in said transmission file list before said virtual machine operates, and transmits to said on-demand unit data acquiring section, the unit data requested from said on-demand unit data acquiring section while said virtual machine operates.

3. The thin client system according to claim 2, wherein said unit data is data of a file,
wherein said unit data previously acquiring section acquires a file before said virtual machine operates and generates a file having dummy data for a file which has not been acquired before said virtual machine operates,
wherein said on-demand unit data acquiring section acquires data of the file requested by said virtual machine while said virtual machine operates and replaces the dummy data of the generated file with the acquired data,
wherein said unit data determining section writes the information of the file acquired by said unit data previously acquiring section before said virtual machine operates in said transmission file list, and
wherein said unit data transferring section transmits the file whose information is written in said transmission file list before said virtual machine operates to said unit data previously acquiring section, and transmits the file requested from said on-demand unit data acquiring section while said virtual machine operates to said on-demand unit data acquiring section.

4. The thin client system according to claim 3, wherein said unit data previously acquiring section generates the dummy data with a specific pattern for every file and generates a signature list in which a set of a pattern of data and a file name is written for every file, and
wherein said on-demand unit data acquiring section:
determines whether or not the pattern of data in a sector read from said second memory section has been written in said signature list,
detects the file name corresponding to the pattern of data from said signature list when the pattern of data in the read sector has been written in said signature list, and
acquires the data of the file corresponding to the detected file name from said unit data transferring section.

5. The thin client system according to claim 1, wherein said on-demand unit data acquiring section replaces the data of the file without rewriting information of a file system.

6. The thin client system according to claim 1, wherein said unit data is data of a sector,
wherein said unit data previously acquiring section acquires data of a sector before said virtual machine operates,
wherein said on-demand unit data acquiring section acquires data of a sector requested by said virtual machine while said virtual machine operates,
wherein said unit data determining section writes in said transmission file list, information of the sector acquired by said unit data previously acquiring section before said virtual machine operates, and
wherein said unit data transferring section transmits the sector whose information is written in said transmission file list before said virtual machine operates to said unit data previously acquiring section, and transmits the sector requested from said on-demand unit data acquiring section while said virtual machine operates to said on-demand unit data acquiring section.

7. The thin client system according to claim 6, wherein said unit data previously acquiring section generates the dummy data with a specific pattern before said virtual machine operates, and
 wherein said on-demand unit data acquiring section:
 determines whether or not the data of the sector read from said second memory section while said virtual machine operates includes a pattern,
 compares the pattern of the data in the read sector and the specific pattern to determines whether or not the data in the read sector is the dummy data, and
 acquires the data in the read sector from said unit data transferring section, when the data in the read sector is the dummy data.

8. The thin client system according to claim 1, wherein said unit data transferring section generates a non-transmitted unit data list in which information of the unit data which has not been transmitted to said unit data previously acquiring section is written before said OS operates, and transmits said non-transmitted unit data list to said unit data previously acquiring section, and
 wherein said unit data previously acquiring section generates the dummy data for the unit data which has been written in said non-transmitted unit data list before said OS operates.

9. The thin client system according to claim 1, wherein said unit data previously acquiring section generates said non-acquired unit data list in which information of the unit data which has not been acquired from said unit data transferring section has been written before said OS operates, and
 wherein said on-demand unit data acquiring section:
 hooks a read request of the unit data from said OS while said OS operates,
 transmits a transmission request of the unit data to said unit data transferring section, when the unit data has been stored in said non-acquired unit data list, and
 deletes the information of the unit data from said non-acquired unit data list, when the unit data is acquired.

10. The thin client system according to claim 1, wherein said unit data determining section comprises at least one:
 a section configured to receive information on a usage situation of the unit data from said on-demand unit data acquiring section, generate at least one list of a list of high use-frequency unit data and a list of recently used unit data based on the received information, and transfer the generated list to said unit data transferring section;
 a section configured to generate a list of unit data having updated date and time later than date and time specified by a manager, and transfer the generated list to said unit data transferring section;
 a section configured to transfer a list given from the manager to said unit data transferring section; and
 a section configured to merge a list (integrating) to be transferred to said unit data transferring section and transfer the merged list to said unit data transferring section.

11. A computer used as one of said first computer and said second computer in the thin client system according to claim 1.

12. A method of implementing a thin client system in which a first computer which is used by a user acquires unit data from a second computer, said method comprising:
 acquiring, by said first computer, the unit data from said second computer through a network by which said first computer and said second computer are separated before an OS (Operating System) of said first computer operates;
 acquiring, by said first computer, unit data requested by said OS from said second computer while said OS operates;
 generating, by said second computer, a transmission file list in which identification information to specify the unit data acquired by said first computer before said OS operates is written, the transmission file list not including files listed in the transmission file list themselves;
 transmitting to said first computer by said second computer, the unit data whose information is written in the transmission file list before said OS operates by said second computer; and
 transmitting to said first computer by said second computer, the unit data requested from said first computer while said OS operates.

13. The method of implementing a thin client system, according to claim 12, further comprising:
 generating, by said first computer, a virtual machine by use of a virtual machine monitor;
 acquiring, by said first computer, the unit data before said virtual machine operates;
 acquiring, by said first computer, the unit data requested by said virtual machine while said virtual machine operates;
 writing, by said second computer, information of the unit data acquired by said first computer before said virtual machine operates, in the transmission file list;
 transmitting, by said first computer, the unit data whose information is written in said transmission file list before said virtual machine operates, to said first computer; and
 transmitting, by said second computer, the unit data requested from said first computer while said virtual machine operates, to said first computer.

14. The method of implementing a thin client system according to claim 12, wherein said unit data is data of a file, and
 wherein said method further comprises:
 acquiring, by said first computer, a file before said virtual machine operates and generating a file having dummy data for a file which is not acquired before said virtual machine operates;
 acquiring, by said first computer, the data of the file requested by said virtual machine while said virtual machine operates;
 replacing, by said first computer, the dummy data of the generated file with the acquired data;
 writing, by said second computer, information of the file acquired by said first computer before said virtual machine operates, in said transmission file list;
 transmitting to said first computer, by said second computer, the file whose information is written in said transmission file list before said virtual machine operates; and
 transmitting, by said second computer, the file requested from said first computer while said virtual machine operates to said first computer.

15. The method of implementing a thin client system according to claim 14, further comprising:
 generating, by said first computer, the dummy data with a specific pattern for every file,
 generating, by said first computer, a signature list in which a set of a pattern of data and a file name is recorded for every file;
 determining, by said first computer, whether or not the data pattern in the sector provided from said second computer has been written in said signature list;

detecting, by said first computer, the file name corresponding to the data pattern from said signature list, when the data pattern in the provided sector is written to said signature list; and acquiring, by said first computer, the data of the file corresponding to the detected file name from said second computer.

16. The method of implementing a thin client system according to claim 12, further comprising:

replacing, by said first computer, data of a file system without rewriting information of the file system.

17. The method of implementing a thin client system according to claim 12, wherein said unit data is data in the sector, and wherein said method further comprises:

by said first computer, acquiring data in a sector before said virtual machine operates;

by said first computer, acquiring data in the sector requested by said virtual machine while said virtual machine operates;

by said second computer, writing information of the sector acquired by said first computer before said virtual machine operates, in said transmission file list; and by said second computer, transmitting to said first computer, the sector whose information is written in said transmission file list before said virtual machine operates, and transmitting to said first computer, the sector requested from said first computer while said virtual machine operates.

18. The method of implementing a thin client system according to claim 17, further comprising:

generating, by said first computer, dummy data with a specific pattern before said virtual machine operates; and determining, by said first computer, whether or not the data in the sector provided from said second computer while said virtual machine operates includes a pattern;

comparing, by said first computer, the specific pattern and the pattern of the data in the provided sector when the data in the sector provided from said second computer includes the pattern;

determining, by said first computer, whether or not the data in the provided sector is the dummy data; and acquiring, by said first computer, data in the provided sector from said second computer.

19. The method of implementing a thin client system according to claim 12, further comprising:

generating, by said second computer, a non-transmitted unit data list in which the information of the unit data which has not been transmitted to said first computer is written before said OS operates;

transmitting, by said second computer, said non-transmitted unit data list to said first computer; and generating, by said first computer, dummy data for the unit data which has been written in said non-transmitted unit data list before said OS operates.

20. The method of implementing a thin client system according to claim 12, further comprising:

generating, by said first computer, said non-acquired unit data list in which information of the unit data which has not been acquired from said second computer is written before said OS operates;

hooking, by said first computer, a read request of said unit data from said OS while said OS operates;

transmitting, by said first computer, a file transmission request of said unit data to said second computer, when said unit data has been recorded in said non-acquired unit data list; and deleting, by said first computer, the information of said unit data from said non-acquired unit data list when acquiring the unit data.

21. The method of implementing a thin client system according to claim 12, further comprising:

performing, by said second computer, at least one of:
(i) receiving information of use situation of the unit data from said first computer, generating at least one of a list of high use-frequency unit data and a list of recently used unit data based on the received information, and transmitting the generated list to said first computer;
(ii) generating a list of unit data having update date and time later than date and time specified by a manager, and transmitting the generated list to said first computer;
(iii) transmitting a list given from the manager to said first computer; and
(iv) merging or integrating a list to be transmitted to said first computer and transmitting the merged list to said first computer.

22. A computer-readable non-transitory storage medium which stores a computer-executable program code to attain an operation of one of the first computer and the second computer in the method of implementing a thin client system according to claim 12.

* * * * *